United States Patent Office 3,423,257
Patented Jan. 21, 1969

3,423,257
BLASTING COMPOSITION CONTAINING
NITRIC ACID
Robert Alan Simpson, Orlando, Fla., and James Paul
Rishel, Edinburg, and George Abraham Cross, New
Castle, Pa., assignors to American Cyanamid Company,
Stamford, Conn., a corporation of Maine
No Drawing. Filed Sept. 1, 1966, Ser. No. 576,548
U.S. Cl. 149—19 4 Claims
Int. Cl. C06b 19/04; C06b 1/04

ABSTRACT OF THE DISCLOSURE

Stable, homogeneous, gelled aqueous nitric acid blasting compositions are provided by employing, as the essential fuel component, a nitric acid-miscible carboxacylic compound, such as acetic acid.

---

This invention relates to blasting agents containing nitric acid and carboxacylic fuel which is at least partially nitric acid-soluble or miscible. It relates further to the provision of non-corrosive, high strength, blasting compositions in gelled form having as essential components nitric acid, an organic carboxacylic compound, a gelling agent and water.

The term "carboxacylic" as used herein means compounds which have at least one carboxy moiety or a moiety which is derived therefrom and has the carboxacyl radical

Examples of such compounds are carboxylic acids, acid salts, anhydrides or amides.

Blasting agents based upon nitric acid and an organic nitrofuel have been known for many years, one of the oldest known blasting compositions being of this type, i.e., the combination of nitric acid and a nitroaromatic compound. Such materials as originally conceived have the severe disadvantage of being in liquid form and corrosive in nature, and thus difficult to handle. Attempts were made to overcome the deficiencies of nitric acid-based explosives since such explosives, by reason of their low cost, are of great commercial importance. Such attempts involved using glass containers with separate internal compartments to contain the nitric acid and keep it separated from the fuel components. These early attempts were far from successful in that the handling of glass containers presents almost insurmountable problems when it is recognized that explosives are used under extremely adverse field conditions.

More recent attempts to prepare useful nitric acid-based explosives involved the use of a gelling agent in combination with an acid-immiscible carbonaceous fuel. The gelling agent increased the viscosity of the explosive without affecting its detonatability. However, because of the presence of such immiscible materials, separation of phases was prone to occur with the formation of corrosive nitric acid exudates.

In view of this state of the art, it is an object of the present invention to provide a blasting agent based upon nitric acid and an organic carboxacyl fuel. It is a further object of the present invention to provide a blasting agent based upon nitric acid and an organic carboxacyl fuel in the form of a water-containing gel which is less corrosive, of high blasting strength and physically stable under normal field conditions. Other objects will be apparent from the ensuing description of this invention.

In accordance with this invention, it has been discovered that a combination of nitric acid with an organic carboxacyl derivative which is at least partially nitric acid-miscible or soluble and a stable gelling agent is a blasting agent which is capable of detonation under field conditions. Such compositions, in view of the ability of the components to form a single phase system are stable against physical separation and are thus substantially devoid of a free nitric acid phase. The blasting compositions of the present invention may advantageously contain other auxiliary materials which do not materially interfere with their blasting ability. Thus, it may be desirable to add ammonium nitrate, an additional fuel material, a density modifying agent and/or a cross-linking agent to enhance the activity of the gelling agent.

The nitric acid which can be used herein is an aqueous solution of 30 to 98% concentration. Nitric acid of about 50 to 80% concentration is very suitable for use in the present invention and such compositions, being readily available in commerce, are preferred.

The carboxacylic compounds which are useful in this invention are, as stated above, at least partially acid miscible or soluble. The degree of solubility or miscibility which is required is dependent on the proportions of the carboxacylic compound in the blasting composition. Solubility or miscibility should be sufficient to permit blending of the nitric acid and carboxacyl components without a great deal of separation of these components into different phases. If the carboxacylic compound is a solid, it is important that it is sufficiently soluble to be dissolved in the aqueous nitric acid to the extent that it is present. If the carboxacyl derivative is a liquid, it is important that it is acid-miscible to the extent of its presence in the composition since otherwise it will form a second liquid phase which might not gel and would create handling and packaging problems. A small amount of undissolved solid carboxacylic fuel is tolerable within the framework of the present invention. However, it is desirable to minimize the quantity of undissolved fuel components. The monomeric carboxacyl compound should have between one and twelve carbon atoms. It may be an acid, anhydride, salt or amide. Monocarboxacylic and polycarboxacylic derivatives as above noted, whether in monomeric or polymeric form, are useful. Mixtures of different acids, or of acids with the above noted derivatives of acids, are also useful in the practice of the present invention. Acids and their derivatives may be aliphatic or aryl in structure. The organic acid derivatives which are particularly useful in the present invention are miscible with aqueous nitric acid, since such compositions are highly stable to separation and thus less corrosive. Among the mono acids which can be used in the practice of the present invention are acetic, propionic, butyric, valeric, isopentanoic, methylpentanoic and trimethylacetic acids. Salts of such acids, e.g., ammonium, sodium, potassium, calcium, magnesium, and the like, are also useful in the present invention. Of these salts the preferred members are the alkali metal salts and others which are at least partially soluble in nitric acid. Amides such as acetamide and propionamide can also be used in the practice of the present invention. Likewise, anhydrides such as acetic anhydride, propionic anhydride, and the like, can also be used.

Other aliphatic acids such as acrylic, butenoic, hexenoic acid, as well as anhydrides, amides and salts of these acids can also be used as the carboxacylic fuel component of the composition of this invention.

Aromatic acids such as benzoic acid, phthalic acid, terephthalic acid, cinnamic acid, as well as the anhydrides, salts and amides derived therefrom are also useful to supply the oxidizable component of the blasting agent of this invention.

The organic carboxacylic component useful in the composition of the present invention may be substituted by halogen groups. Among such halogen-substituted acids and derivatives which can be used are chloroacetic, and dichloroacetic, trichloroacetic, bromopropionic, iodopropionic, dibromobutyric, chlorovaleric, parachlorobenzoic and parachlorocinnamic acids.

Polybasic aliphatic acids as well as anhydrides, partial esters, amides and salts of such acids may also be used to supply the oxidizable carboxacylic component useful in the present invention. Among such polybasic acids are oxalic, malonic, succinic, glutaric, adipic, pimelic, suberic, azelaic, malic, maleic and fumaric. Similarly alkali metal salts and amides of such polybasic acids may also be used for the practice of the present invention. Also substituted derivatives of such acids, e.g., halogenated derivatives are also useful for the practice of the present invention.

Polymeric acids, represented by polyacrylic acid, polymethacrylic acid, polymaleic acid and copolymers of such acids with each other or vinyl derivatives such as alkyl vinyl ethers or vinyl halides are also useful herein.

From the foregoing group of carboxacylic compounds, those which are fully miscible or fully soluble in aqueous nitric acid are preferred. Examples of these are the lower alkanoic acids, e.g., acetic acid, propionic acid, aliphatic polybasic acids such as oxalic acid and succinic acid; and polybasic aromatic acids, e.g. phthalic acid.

A gelling agent which is stable in the presence of aqueous nitric acid should be present in the compositions of this invention. The choice of a gelling agent is not critical, so long as the agent is stable and effective in aqueous nitric acid. Among the commercially available materials are water-soluble interpolymers of methyl vinyl ether and maleic anhydride, available under the trademark "Gantrez AN" resins, polyvinylpyrrolidones of various grades, polyacrylic acids and ammonium polyacrylates, copolymers of ethylene and maleic anhydride, copolymers of acrylamide and N,N'-methylene bisacrylamide monomers and polyacrylamide. Silica gels are also useful gelling agents since they are acid resistant. Examples of commercially available silica gels are those sold under the trademarks "Cabosil" and "Santocel" silica gels. The preferred gelling agent for use in the present invention is derived by the copolymerization of methyl vinyl ether and maleic anhydride.

Best advantage of the gelling agent is taken by the inclusion in the blasting agent of cross-linking agents capable of functioning with the particular gelling agent used. In many cases, these are metal salts. Thus, preferably, chlorides or sulfates, but also acetates, hydroxides and nitrates of such metals as tin, chromium, lead, zirconium, iron, copper, zinc, nickel, manganese, cobalt, titanium and aluminum may be used.

While the present invention provides a blasting composition which is independent of the use of ammonium nitrate or other oxidants (e.g., sodium nitrate), it may be desirable for specific uses to include ammonium nitrate or other oxidants in the blasting composition. When used, ammonium nitrate can be present either as a finely ground material or in the form of fertilizer grade prills.

While it is not necessary for the practice of the present invention to include an additional fuel material, it may be convenient and practical to do so. In some cases, depending upon the availability of materials, a nitro fuel or an oxidizable carbon-containing material of another type may be added. Useful nitro fuels are chosen from liquid or solid organic nitro compounds having one or more nitro groups attached to a hydrocarbon moiety. Suitable nitro fuels are nitroparaffins such as nitromethane, dinitromethane, trinitromethane, tetranitromethane, nitroethane, dinitroethane, nitropropane, dinitropropane, nitrobutane, dinitrobutane, nitroisobutane, dinitroisobutane, and the like. Examples of nitroaromatic fuels are nitrobenzene, dinitrobenzene, nitrotoluene and dinitrotoluene.

The nitro fuels which may be optionally used in the present invention may contain halogen groups in addition to hydroxy or alkoxy groups. Among the halogenated nitro fuels are nitrochloromethane and dinitrochlorobenzene. Nitro compounds which bear carboxy groups or their anhydrides, salts or amides are useful in the present invention, but such compounds are classified for present purposes as carboxacylic fuels.

It is often advantageous to include a density modifying agent in the formulations of the present invention, especially when such formulations are prepared from nitric acid solutions of less than 80% by weight nitric acid. Such density modifying agents are acid-resistant materials which contain entrapped air such as perlite, hollow glass spheres or cermiculite. Other useful materials, are frothing agents of the non-ionic surfactant type, for example, esters of sorbitan with fatty acids, e.g., sorbitan monopalmitate, sorbitan monostearate and sorbitan monolaurate.

Blasting compositions of the present invention should contain between about 3 and 65% by weight of nitric acid on an anhydrous basis. Additionally, they must have a minimum of about one percent by weight of the carboxacylic fuel and a gelling agent in a weight proportion of about 0.1 to about 10%, based on the weight of the entire composition. Though not entirely necessary, it is desirable to have up to about 5% by weight of a cross-linking agent to enhance the action of the gelling agent. Density modifying agents can be present in a concentration of up to about 10%. When ammonium nitrate is used as an auxiliary oxidant, as much as 70 to 80% may be present in the explosive composition. In addition to the foregoing components, the blasting composition of the present invention may have up to about 35% of an additional and different oxidizable fuel such as a liquid or solid nitro fuel.

It is preferred to use for each 100 parts of anhydrous nitric acid 70 to 150 parts of the carboxacyl component, 0 to 60 parts of the oxidizable fuel, 0 to 800 parts of ammonium nitrate, 5 to 40 parts of the acid-stable gelling agent, 2 to 20 parts of the cross-linking agent and 10 to 240 parts of water.

The fuel:oxidizer components in the composition of the present invention should preferably be present in such quantities as to give an "oxygen balanced" composition. By "oxygen balance" is meant the availability of sufficient oxygen in the composition to oxidize the fuel components to their maximum state of oxidation, e.g., combined carbon to carbon dioxide.

The various components of the blasting compositions of this invention can be blended in any convenient manner. It may be necessary to apply heat moderately during the blending steps or to adjust the order of addition of the various components to enable effective blending to take place. The manner of preparing the material is not a part of the present invention.

The following examples are presented to illustrate the present invention. In the examples, parts and percentages are on a weight basis unless otherwise noted.

Example 1

The following mixture was prepared to illustrate the composition of the present invention in which the carboxacylic component is an alkanoic acid and a nitro fuel is present:

| Formula: | Percent |
|---|---|
| Nitric acid (anhydrous) | 13.8 |
| Acetic acid (glacial) | 10.9 |
| Dinitrotoluene | 7.3 |
| Ammonium nitrate (−35 mesh) | 64.1 |
| Gantrez AN−169 resin [1] | 1.0 |
| Stannous chloride (cross-linking agent) | 1.0 |
| Water | 1.9 |
| | 100.0 |

[1] Gelling agent.

This formulation had the following properties:

Density _____ g./cc__ 1.40
Detonation velocity (confined in 1½ inch diameter
steel pipe) _____ m./sec__ 5150
Weight strength (as percent of blasting gelatin) __ 86

The foregoing is a highly efficient blasting agent prepared from essentially low cost materials. Similar compositions are obtained by substitution of other acids for the acetic acid used in Example 1. Among such equivalent acids are propionic acid, trichloroacetic acid, nitropropionic acid, and the like.

Example 2

A blasting composition of the following formula was prepared:

Formula: Percent
Nitric acid (70% aqueous solution) _____ 15.2
Acetic acid (glacial) _____ 14.8
Dinitrotoluene _____ 2.0
Ammonium nitrate (−35 mesh) _____ 20.0
Ammonium nitrate (whole prills) _____ 46.5
Gantrez AN-169 resin _____ 1.0
Stannous chloride _____ 0.5

100.0

It had the following properties:

Density _____ g./cc__ 1.38
Detonation velocity (confined in 1½ inch diameter
steel pipe) _____ m.p.s__ 4570
Weight strength (as percent of blasting gelatin) ____ 81

Example 3

A blasting composition of the following formula was prepared:

Formula: Percent
Nitric acid (70% aqueous solution) _____ 15.3
Acetic acid (glacial) _____ 17.0
Ammonium nitrate (−35 mesh) _____ 63.6
Eccospheres-R [1] glass spheres _____ 2.0
Grantrez AN-169 resin _____ 1.0
Stannous chloride _____ 0.5
Water _____ 0.6

100.0

[1] Hollow glass spheres of 30 to 300 micron particle size manufactured by Emerson and Cuming, Inc.

It had the following properties:

Density _____ g./cc__ 1.36
Detonation velocity (confined in 1½ inch diameter
steel pipe) _____ m.p.s__ 3320

Example 4

A blasting composition of the following formula was prepared:

Formula: Percent
Nitric acid (70% aqueous solution) _____ 13.8
Acetic acid (glacial) _____ 13.7
Ammonium nitrate (−35 mesh) _____ 70.0
Sorbitan monopalmitate _____ 1.0
Gantrez AN-169 resin _____ 1.0
Stannous chloride _____ 0.5

100.0

It had the following properties:

Density _____ g./cc__ 1.26
Detonation velocity (confined in 1½ inch diameter
steel pipe _____ m.p.s__ 4800
Weight strength (as percent of blasting gelatin) ___ 76

Example 5

The following blasting composition was prepared:

Formula: Percent
Nitric acid (42° Baumé) _____ 14.0
Acetic acid (glacial) _____ 13.0
Sorbitan monopalmitate _____ 1.5
Ammonium nitrate _____ 70.0
Gantrez AN-169 resin _____ 1.0
Chromium nitrate [1] _____ 0.5

100.0

[1] Cross-linking agent.

It had the following properties:

Density _____ g./cc__ 1.30
Detonation velocity (confined in 1½ inch diameter
steel pipe) _____ m.p.s__ 4000

Example 6

The following blasting composition was prepared:

Formula: Percent
Nitric acid (80% aqueous solution) _____ 18.5
Azelaic acid _____ 8.5
Sorbitan monopalmitate _____ 1.5
Ammonium nitrate _____ 70.0
Gantrez AN-169 resin _____ 1.0
Chromium nitrate _____ 0.5

100.0

It had the following properties:

Density _____ g./cc__ 1.20
Detonation velocity (confined in 1½ inch diameter
steel pipe) _____ m.p.s__ 4100

Example 7

A blasting composition containing an aromatic monocarboxylic acid was prepared as follows:

Formula: Percent
Nitric acid (42° Baumé) _____ 18.4
Benzoic acid _____ 8.6
Sorbitan monopalmitate _____ 1.5
Ammonium nitrate _____ 70.0
Gantrex AN-169 resin _____ 1.0
Chromium nitrate _____ 0.5

100.0

It had the following properties:

Density _____ g./cc__ 1.22
Detonation velocity (confined in 1½ inch diameter
steel pipe) _____ m.p.s__ 2600

Example 8

A blasting composition with a carboxacylic acid amide was prepared as follows:

Formula: Percent
Nitric acid (42° Baumé) _____ 18.4
Acetamide _____ 8.6
Sorbitan monopalmitate _____ 1.5
Ammonium nitrate _____ 70.0
Gantrez AN-169 resin _____ 1.0
Chromium nitrate _____ 0.5

100.0

It had the following properties:

Density _____ g./cc__ 1.14
Detonation velocity (confined in 1½ inch diameter
steel pipe) _____ m.p.s__ 5300

Example 9

Blasting compositions with various nitric acid concentrations were prepared as follows:

FORMULA

|  | 67% | 40% | 30% | 20% |
|---|---|---|---|---|
| Nitric acid (anhydrous) | 9.4 | 9.4 | 9.4 | 9.4 |
| Water | 4.6 | 14.1 | 22.0 | 37.6 |
| Acetic acid | 13.0 | 9.0 | 7.3 | 4.8 |
| Sorbitan monopalmitate | 1.5 | 1.5 | 1.5 | 1.5 |
| Ammonium nitrate | 70.0 | 62.0 | 55.3 | 41.7 |
| Gantrez AN-169 resin | 1.0 | 3.0 | 3.5 | 3.5 |
| Chromium nitrate | 0.5 | 1.0 | 1.0 | 1.5 |
|  | 100.0 | 100.0 | 100.0 | 100.0 |

They had the following properties:

| | | | | |
|---|---|---|---|---|
| Density, g./cc | 1.30 | 1.23 | 1.24 | 1.25 |
| Detonation velocity, m.p.s. (4-inch diameter steel pipe) | 5,000 | 5,400 | 4,600 | Failed |

Example 10

A blasting composition with no ammonium nitrate was prepared as follows:

Formula: Percent
- Nitric acid (90% aqueous solution) _____ 68.0
- Acetic acid (glacial) _____ 22.0
- Sorbitan monopalmitate _____ 5.0
- Gantrez AN-169 resin _____ 3.0
- Chromium nitrate _____ 2.0

100.0

It had the following properties:

Density _____ g./cc__ 1.28
Detonation velocity (confined in 4-inch diameter steel pipe) _____ m.p.s__ 6130

Example 11

Blasting compositions with various gelling agents were prepared as follows:

FORMULA

| Component | Percentage | | | |
|---|---|---|---|---|
|  | A | B | C | D |
| Nitric acid (42° Baumé) | 14.0 | 14.0 | 14.0 | 14.0 |
| Acetic acid (glacial) | 13.0 | 13.0 | 13.0 | 13.0 |
| Sorbitan monopalmitate | 1.5 | 1.5 | 1.5 | 1.5 |
| Ammonium nitrate | 70.0 | 69.0 | 70.0 | 70.0 |
| Polyvinylpyrrolidone resin | 1.0 |  |  |  |
| Copolymer acrylamidemethyl-enebisacrylamide 95/5 |  | 2.0 |  |  |
| Cab-O-Sil silica gel |  |  | 1.5 |  |
| Ethylenemaleic anhydride resin |  |  |  | 1.5 |
| Chromium nitrate | 0.5 |  |  |  |
| Ammonium persulfate |  | 0.5 |  |  |
|  | 100.0 | 100.0 | 100.0 | 100.0 |

These compositions had the following properties:

| | | | | |
|---|---|---|---|---|
| Density (g./cc.) | 1.15 | 1.20 | 1.10 | 1.20 |
| Detonation velocity (m.p.s.) (4-inch diameter steel pipe) | 6,000 | 4,960 | 5,300 | 4,810 |

We claim.

1. A gelled blasting composition comprising aqueous nitric acid in an amount to provide from about 3% to about 65%, by weight, of nitric acid on an anhydrous basis, at least about 1%, by weight, of an alkanoic acid of from 2 to 6 carbon atoms which is miscible with the nitric acid to the extent said alkanoic acid is present in the composition, from about 0.1% to about 10% by weight, of a gelling agent and from 0% to about 5%, by weight, of a cross-linking agent.

2. A gelled blasting composition comprising aqueous nitric acid and for each 100 parts of nitric acid on an anhydrous basis, 70 to 150 parts of an alkanoic acid having from 2 to 6 carbon atoms, 0 to 60 parts of an oxidizable non-detonatable nitro fuel, 0 to 800 parts of ammonium nitrate, 5 to 40 parts of an acid-stable gelling agent, 2 to 20 parts of an activating cross-linking agent and 10 to 240 parts of water.

3. The composition of claim 2 containing up to about 10% by weight of a density modifying agent selected from the group consisting of (a) an acid-resistant material containing entrapped air and (b) a non-ionic surfactant.

4. The composition of claim 3 containing about 14% of 42° Baumé nitric acid, about 13% of glacial acetic acid, about 1.5% of sorbitan monopalmitate, about 70% of ammonium nitrate, about 1% of a water soluble interpolymer of methyl vinyl ether and maleic anhydride, and about 0.5% of chromium nitrate.

References Cited

UNITED STATES PATENTS

| 3,164,503 | 1/1965 | Gehrig | 149—74 X |
| 3,242,019 | 3/1966 | Gehrig | 149—60 X |
| 3,260,632 | 7/1966 | Olstowski et al. | 149—60 X |
| 3,282,754 | 11/1966 | Gehrig | 149—74 |
| 3,296,044 | 1/1967 | Gehrig | 149—74 X |
| 3,306,789 | 2/1967 | Logan et al. | 149—74 X |
| 3,336,981 | 8/1967 | Barron et al. | 149—74 X |

LELAND A. SEBASTIAN, Primary Examiner.

U.S. Cl. X.R.

149—74